Aug. 5, 1969  J. G. TEMPLETON ET AL  3,459,297
LABEL PACKAGING AND HANDLING
Filed Dec. 20, 1967  4 Sheets-Sheet 1

INVENTOR.
JOHN GLENN TEMPLETON
HOWARD J. SCHUITEMA
BY
ATTORNEYS

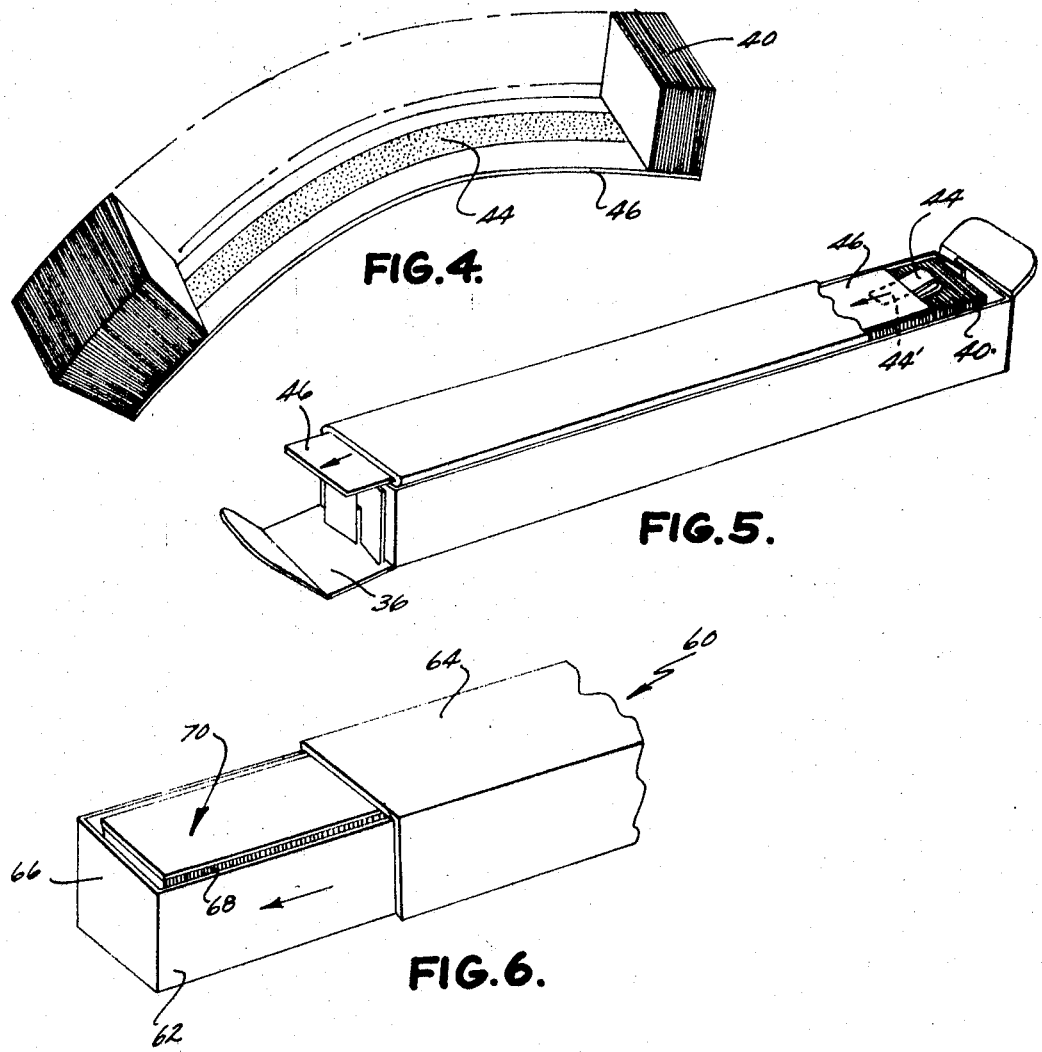

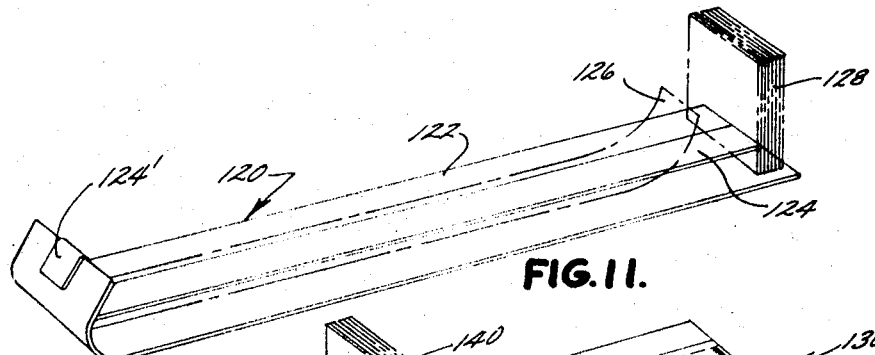
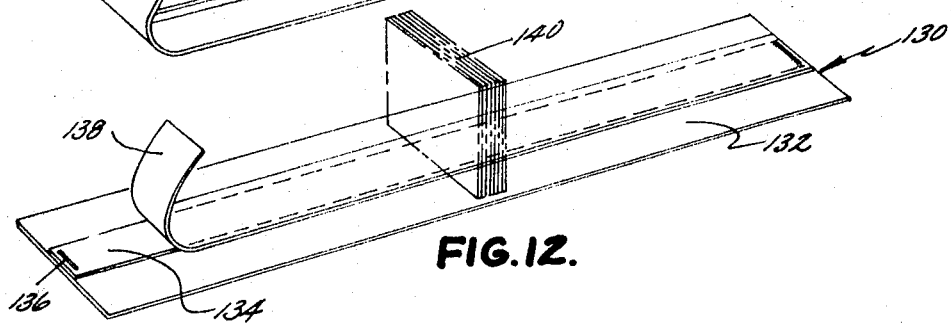
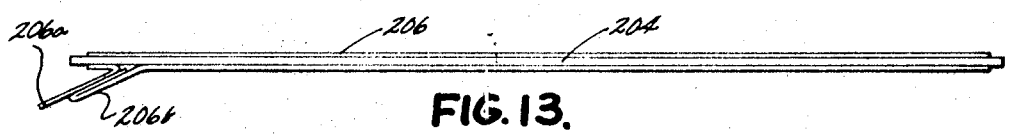
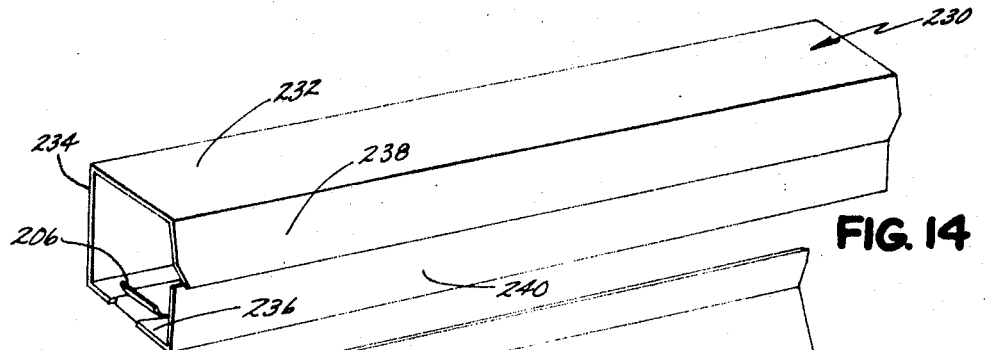
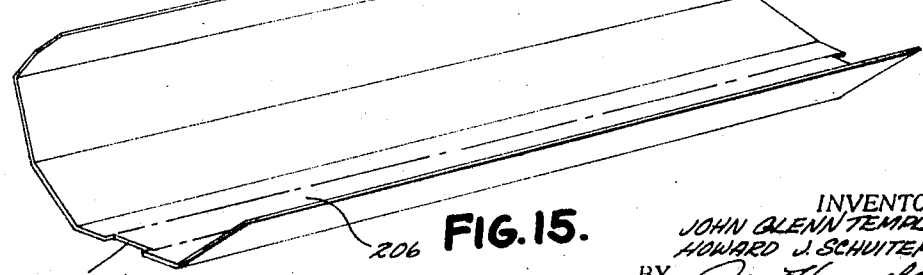

United States Patent Office 3,459,297
Patented Aug. 5, 1969

3,459,297
LABEL PACKAGING AND HANDLING
John Glenn Templeton and Howard J. Schuitema, Grand Rapids, Mich., assignors to Rose Patch & Label Company, Grand Rapids, Mich., a corporation of Michigan
Filed Dec. 20, 1967, Ser. No. 692,124
Int. Cl. B65d 83/00, 1/34
U.S. Cl. 206—56                          8 Claims

ABSTRACT OF THE DISCLOSURE

A label pack assembly adapted for manual or mechanized handling and label removal, having an elongated enclosure around a pack of labels, the labels being face to back with one edge of each releaseably secured to an adhesive coated strip means of sufficient flexibility to enable spreading apart of the labels by controlled flexing of the strip and label pack to a curvalinear configuration.

The strip means is a portion of the enclosure, or a separate strip in the enclosure. If the latter, it may be adhesive coated cardboard, plastic, or other generally flexible element having some resistance to flexing, or such a support element plus an attached band or loop of highly flexible adhesive tape of cloth, paper or the like, or such a tape.

Background of the invention

This invention relates to packs of individual, small, sheet like articles, particularly labels for clothing and the like, and relates more particularly to the packaging and supporting of packs of cloth labels for optimum mechanical or manual handling and singulation thereof.

Printed labels to be applied to garments are conventionally shipped from the label manufacturer to the garment manufacturer in elongated packs. The enclosures generally comprise cartons, tubes, or sleeve enclosed trays of stacks of labels. Before use, the labels are usually removed from their enclosure as a group to enable ready access to them. These labels are then individually sewn to a garment by a sewing machine to which the individual labels are fed manually or mechanically. Whether fed manually or mechanically, the labels in the stack have a tendency to become disheveled and unorganized, to impede or disrupt the operation. The small labels become overturned, rotated out of position, knocked onto the floor, etc.

Further, although clothing labels are pre-printed by the label manufacturer, frequently the garment manufacturer prints additional information such as sizes on the individual labels. Since the labels in the conventional stack do not lend themselves to simple, dependable, and rapid handling, considerable expense and time are required to feed the labels to the printer and re-organize them again for attachment to garments.

Summary of the invention

It is an object of this invention to provide a label pack assembly that retains the individual labels in properly oriented and organized relation, while allowing singulation of the individual labels from the pack in controlled fashion for manual or mechanized handling. The individual labels are securely retained in proper position and orientation in the pack for simplified handling. The labels can be completely exposed for ready access, by being removed as an integral pack from their enclosure cartons, tube, or tray and sleeve, but still maintain their group positioning, orientation, and organization until each individual label is purposely singulated from the pack.

The entire organized pack of labels can be re-positioned from their storage position where all of the labels are in mutually supporting relationship, to a spread but retained relationship enabling optimum access to individual labels for separation from the pack, i.e. singulation.

The label pack is supported by and removably adhesively secured to flexible support strip means that can bend or flex from a generally planar storage position to a smooth curvalinear configuration for individual label spreading and removal. The support strip means can constitute one panel of the pack enclosure structure, which panel and pack can be exposed by opening and spreading of the enclosure, or by removing this panel from the structure. Alternatively, the support strip means can be separable from, and received by the enclosure structure. It can constitute an adhesive coated cardboard element, or an adhesive tape or strip, preferably attached to, supported by, and removable from a cardboard element. Various details of the assembly and additional objects and advantages will become apparent from the following detailed description, with the invention being defined by the attached claims.

Brief description of the drawings

FIG. 4 is a perspective view of the label pack and its support strip removed from the assembly in FIG. 3, and bent or flexed to a curvilinear configuration;

FIG. 5 is a perspective view of the assembly in FIG. 3, showing the technique of stripping the support means from the label pack for use of the label pack in a conventional mechanical handling apparatus;

FIG. 6 is a fragmentary perspective view of a third embodiment of the assembly;

FIG. 11 is a perspective view of a label pack assembly, and particularly support strip means formed of a flexible element and an adhesively attached tape;

FIG. 12 is a perspective view illustrating a label pack assembly utilizing a support strip means formed of a flexible element and a tape attached by staples;

FIG. 13 is a side elevational view of a further modified support strip means formed of a flexible element and a tape loop;

FIG. 14 is a perspective view showing a fifth embodiment of a label pack assembly with enclosure; and FIG. 15 is a perspective view showing the enclosure in FIG. 14 in opened position for access to the label pack and support strip.

Description of the preferred embodiments

As explained briefly in the introductory portion of the application, and as will be noted from the drawings, the label pack assembly can employ a variety of related support strip means to which the edges of the individual labels are attached in face-to-back relationship to form a pack, and a variety of cooperative enclosure means wherein the support strip means may or may not form an actual portion of the enclosure structure.

Figure 1:
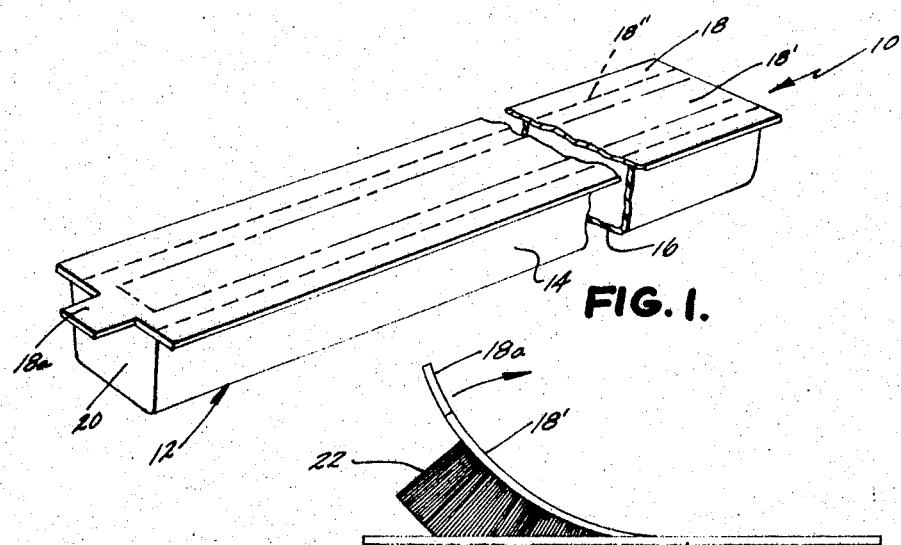
FIG. 1 is a perspective view of one embodiment of the novel label pack assembly in package form.
Figure 2:
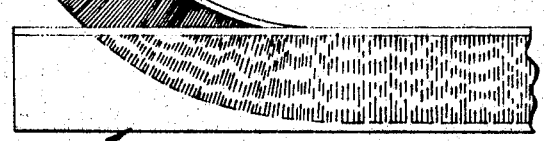
FIG. 2 is a fragmentary side elevational view of the assembly in FIG. 1, showing the label pack and its support means being removed from the enclosure housing.

Thus, in FIG. 1 and FIG. 2, the support strip means actually forms a panel of the enclosure, but is separable therefrom along perforated lines so that the label pack, which is adhesively secured to the inner face of this separable panel can be separated from the enclosure. More specifically, in this first embodiment 10 of the complete assembly, the enclosure 12 constitutes an elongated carton having side walls 14, bottom wall 16, and top wall 18 which includes a separable center portion 18' straddled by perforations 18" and preferably having a pull-tab 18a on one end. The main base portion can be enclosed by end walls 20. This base may be made of any suitable material such as plastic, cardboard or the like, while the top wall or cover 18 is preferably formed of cardboard so that it will readily tear along its perforation lines. Secured to the inner face of cover 18, and specifically to portion 18' thereof, is a pack of individual labels 22, arranged face-to-back, so that one edge of each label may be secured to the panel 18'. This securement is by a thin coating of adhesive which is indicated by the phantom lines in FIG. 1. This adhesive may be a conventional pressure sensitive adhesive of the type generally available on the market.

By securing the common edges of the labels in this manner, when panel 18' is removed from enclosure as shown in FIG. 2, the pack of labels remains organized, properly oriented, in their secured position until each individual label is forcibly removed from the flexible support strip panel. It should be noted that this support strip must have sufficient flexibility to readily bend to a curvilinear configuration for spreading of the unattached outer edges of the labels to enable each label to be grasped manually or mechanically for removal from the support strip.

Figure 3:
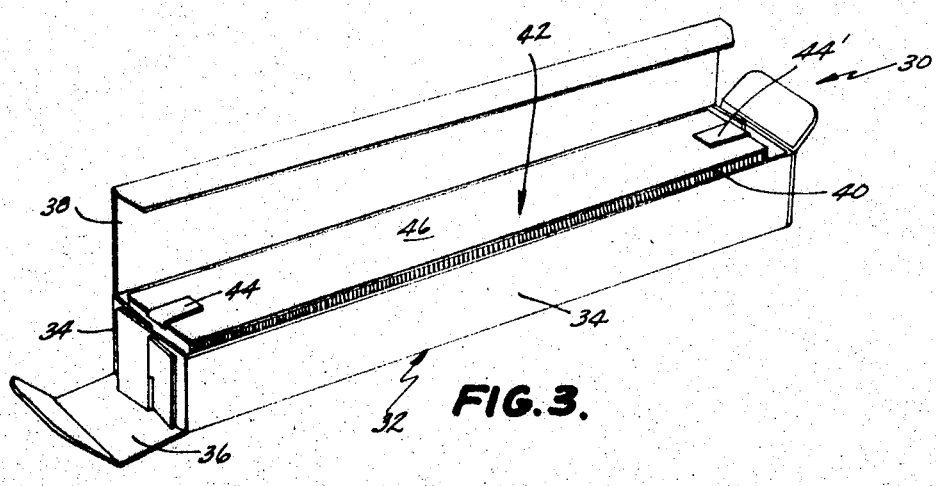
FIG. 3 is a perspective view of a second embodiment of label pack assembly.

FIGS. 3 and 4 illustrate another type of enclosure means and another type of support strip means. More specifiically, the assembly 30 in FIG. 3 includes an enclosure carton 32 having a pair of side walls 34, a bottom wall, hinged end flaps 36 and a hinged cover 38. Within this carton is a plurality of labels 40 arranged face-to-back in a pack, and adhesively secured to the support strip means 42. In this instance, support strip means 42 includes two elements namely a highly flexible means 42 with practically nil resistance to flexing, such as pressure sensitive tape, and a reinforcing support element 46 which is generally flexible but has some resistance to flexing, such as a thin layer of plastic, cardboard, or the like. The purpose of element 46 is to enable the entire pack to be readily removed from the carton and handled, but enabling separation therefrom of the tape 44 and the pack of labels 40 if this is desired for the particular equipment or process involved with label singulation. If desired, both elements can be employed when flexing and spreading the labels in the curvilinear configuration as illustrated in FIG. 4. Alternatively, the end tabs 44' of tape 44 which have adhesive on the opposite face with respect to the adhesive on the main portion of tape 44, can be removed from their overlapping relationship on the bottomside of element 46 for separation of the tape from the element 46. This tape, being completely flexible in all curvilinear relationships and not having a tendency to crease even when bent or curved through large angles of curvature, enables the label pack to be spread substantially through a larger angle of curvature for optimum access to individual labels when singulating.

Actually, instead of tape 44 being overlapped on the underside of element 46 as illustrated in FIG. 3, it may be doubled back on the same side of element 46 as illustrated at 44" in FIG. 5. The adhesive on the end of tape 44 will then be on the same side as the adhesive that secures the individual labels to the tape. Such a tape might be typical pressure sensitive tape, for example. The advantage of this particular variation in construction is that it enables removal of element 46 and tape 44 from the entire label pack assembly while still in the carton, so that if the particular clothing manufacturer desires not to use this novel feature, he can remove elements 44 and 46 to leave the stack of labels unattached to be employed on conventional equipment. This removal is done simply by opening the end flap 36 of the carton, pulling the adjacent tape end loose from element 46, grasping the end of element 46, and pulling it longitudinally with respect to the carton and the label pack, so that tape 44 is pulled and stripped from the opposite end of the pack of labels 40 (FIG. 5), leaving the labels intact in the carton.

Figure 7:
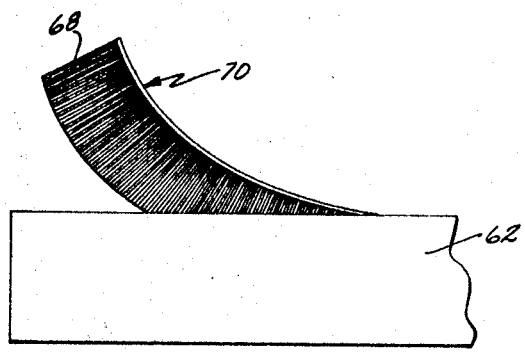
FIG. 7 is a fragmentary side elevational view of the assembly in FIG. 6, showing the label pack and support strip being removed.

In the third embodiment illustrated in FIG. 6, the assembly 60 includes a tray 62 inside of an enclosure sleeve 64. This tray may or may not have an end panel 66. The labels 68 are adhesively secured to support strip means 70. This support strip means may have the label adhesively secured directly to one of its faces, as illustrated in FIG. 1 and FIG. 2 for example, or may utilize the cardboard element plus overlapping tape ends as illustrated in FIGS. 3 and 11 for example, or may have the tape secured by staples as shown in FIG. 12, with a protective removable cover sheet as shown, or may utilize the looping type construction shown in FIG. 13 for example. Basically therefore, FIG. 6 illustrates the adaption of the novel assembly to a tube and tray type enclosure. Once the tray 62 is removed from the tube 64, the labels 68 and support strip means 70 are removed therefrom as illustrated in FIG. 7, with the support strip 70 having flexibility to be flexed to a curvilinear configuration for spreading of the outer unattached label edges.

Figure 8:
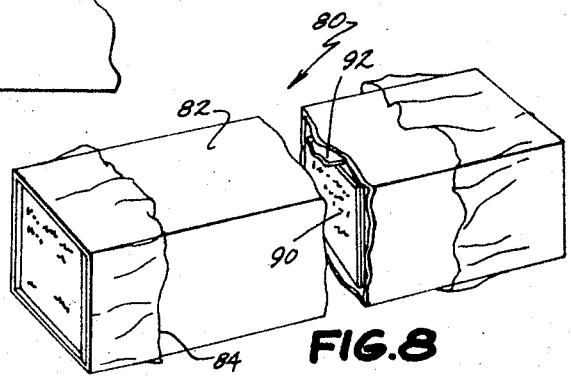
FIG. 8 is a fragmentary perspective view of a fourth embodiment of the assembly utilizing an enclosure tube.

The fourth embodiment of the assembly illustrated in FIG. 8, constitutes an assembly 80 enclosed in a tube 82 which has its ends closed with any suitable overwrap or cover such as the transparent sheaths 84 as cellophane, suitable shrink film or the like, secured as by heat sealing or the like. The labels 90 are retained in a pack by the support strip means 92 which in this instance constitutes only an elongated tape of cloth, paper, or other like flexibly materials having an adhesive on one face for securement of the common edges of the labels. The entire pack is thus removed from the tube after removal of end covers 84, and is retained in an organized relationship on flexible support strip means 92. It will be noted that this support strip means engages and is secured to only the central portion of one edge of each label.

Figure 9:
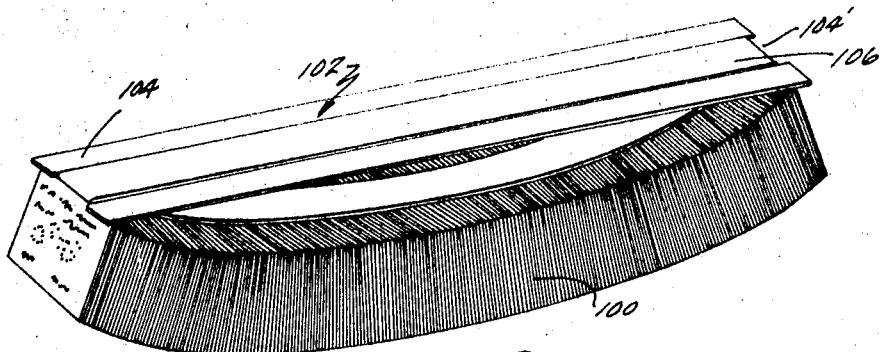
FIG. 9 is a perspective view of a label pack and its support strip means which may be housed in the tube enclosure in FIG. 8.

In FIG. 9, the pack of labels 100 is shown secured to support strip means 102 that constitutes a generally flexible strip 104 of cardboard interfitted inside a loop 106 of tape. This tape has adresive on one face of one half of the loop for securement to the label pack, but is retained on element 104 by having an overall doubled length slightly less than the overall length of element 104, to fit into the notches 104' at the ends of element 104. Removal of element 104 from the tape and labels can be achieved simply by bending element 104 to cause its overall length to be less than that of the doubled tape loop. In the packaged enclosure, element 104 serves to support the pack of labels, but its removal is normally desirable to enable the more flexible tape to be deformed through a larger angle of curvature when formed into a curvilinear configuration for singulation of the labels. The same length tape can be accommodated to shorter package lengths and shorter length elements 104 as illustrated in FIG. 10, by doubling portions of the tape as at 106a.

In the manufacture of the support strip means, in order to enable the combination element and tape to be handled without clinging to each other prior to attachment of the labels, suitable removable protective cover elements coated with release agent as for example silicon release agents, may be employed as illustrated in FIGS. 11 and 12. More specifically, the support strip means 120 in FIG. 11 includes the somewhat flexible element 122 as of cardboard or plastic, plus a more flexible tape 124 which may have its ends doubled over and secured to the underside of element 122 as illustrated at 124'. A protective removable cover strip 126 is temporarily attached over the exposed adhesive surface of tape 124 and removed just prior to assembling a pack of labels 128 on the support strip means.

Similarly the support strip means 130 in FIG. 12, including the cardboard element 132 and the tape 134 secured at its end to the cardboard by staples 136, as a removable protective cover strip 138. After removal of strip 138, labels 140 (shown in phantom) can then be adhesively attached to tape 134 to form a unitary pack.

Figure 10:
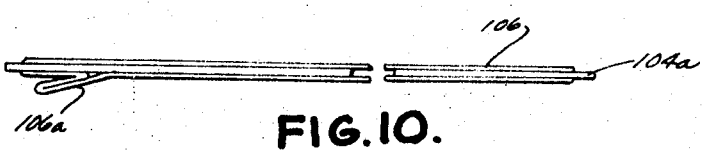
FIG. 10 is a fragmentary side elevational view of a support strip means of the loop type generally shown in FIG. 9.

If desired, as illustrated in FIG. 13, the loop type of tape 206, similar to the loop in FIG. 10, can be secured around the notched support element 204 and can be separated therefrom by overlapping and adhesively securing together the ends 206a and 206b of the tape. By doubling over suitable portions of end 206b, the length of the tape can be adjusted to accommodate the particular length of support 204 and thus the length of the label pack desired. Also, this doubling over of the tape provides a pull tab for readily separating the ends of the tape loop to facilitate removal of the tape from the packed array of labels.

As explained with respect to FIGS. 1 and 2, the support strip means can form an actual part of the enclosure assembly. A modified form of this is illustrated in FIG. 14 as the fifth form of the complete assembly. More specifically, the enclosure housing 230 may include a top panel 232, on side panel 234 of conventional type, a special bottom panel 236, and overlapping flaps 238 and 240 forming the fourth panel. The structure may or may not include folding end flaps. The special bottom panel 236 has notches 236' in its ends, to receive a tape loop 206 for adhesive attachment of a label pack. Access to the label pack is readily achieved merely by separating the adhesively secured overlapping panels 238 and 240, and spreading the carton open as illustrated in FIG. 15. Then, by separation of the overlapping ends of the tape which may be as illustrated at 206a and 206b in FIG. 13, the entire label pack with its support strip tape can be removed from the enclosure.

It will be obvious to those skilled in the art, after reviewing this disclosure, that the form of the invention can be modified in many different ways without departing from the concept presented.

We claim:
1. A label pack assembly of organized secured labels capable of being spread for individual removal without loss of organization, comprising: an elongated label retaining enclosure with an elongated label support strip means having flexibility along its length to be controllably flexed to a curvilinear configuration; said strip means having contact adhesive substantially along its length; and a plurality of like adjacent labels arranged face to back along said strip means, with one edge of each being releasably secured to said adhesive, and the label edges opposite said one edge of each label being freely spreadable by controlled flexing of said strip means to a curvilinear configuration for individual label removal without loss of organization of the remaining labels.

2. The label pack assembly in claim 1 wherein said enclosure includes said strip means as one separable wall thereof.

3. The label pack assembly in claim 2 wherein said enclosure has perforations along the opposite lateral edges of said one wall.

4. The label pack assembly in claim 2 wherein said enclosure is separable along a wall other than said one wall to enable enclosure opening along its length for access to the entire label pack.

5. The label pack assembly in claim 1 wherein said strip means comprises an adhesive coated tape attached to an elongated generally flexible support element having limited resistance to flexing.

6. The label pack assembly in claim 5 wherein said tape comprises a loop extending around said support element, and having one outer face adhesively coated.

7. The label pack assembly in claim 6 wherein said support element has notches on its ends, and said tape is narrower than said element and fits within said notches to be normally retained on said element when said element is generally in one plane and to be removable from said element when said element is flexed out of its plane.

8. The label pack assembly in claim 5 wherein said tape has doubled back ends adhesively secured to the ends of said support element, to enable said tape and said element to be readily stripped from said pack of labels by longitudinal movement of said element with respect to said enclosure and said label pack.

References Cited
UNITED STATES PATENTS

| | | | |
|---|---|---|---|
| 762,916 | 6/1904 | Lachmann | 206—40.5 |
| 2,739,706 | 3/1956 | Macomber | 206—73 |
| 2,825,162 | 3/1958 | Flood. | |

WILLIAM T. DIXSON, JR., Primary Examiner

U.S. Cl. X.R.

206—73